(12) United States Patent
Frebourg et al.

(10) Patent No.: US 11,377,383 B2
(45) Date of Patent: Jul. 5, 2022

(54) BENDING THIN GLASS

(71) Applicant: SAINT-GOBAIN GLASS FRANCE, Courbevoie (FR)

(72) Inventors: Philippe Frebourg, Senlis (FR); Hervé Thellier, Pimprez (FR); Thierry Olivier, Thourotte (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 285 days.

(21) Appl. No.: 16/464,570

(22) PCT Filed: Nov. 23, 2017

(86) PCT No.: PCT/FR2017/053235
§ 371 (c)(1),
(2) Date: May 28, 2019

(87) PCT Pub. No.: WO2018/100272
PCT Pub. Date: Jun. 7, 2018

(65) Prior Publication Data
US 2021/0101820 A1    Apr. 8, 2021

(30) Foreign Application Priority Data

Nov. 30, 2016  (FR) ........................................ 1661720

(51) Int. Cl.
*C03B 23/035*    (2006.01)
*C03B 23/03*     (2006.01)

(52) U.S. Cl.
CPC ...... *C03B 23/0357* (2013.01); *C03B 23/0305* (2013.01); *C03B 23/0307* (2013.01); *C03B 2225/02* (2013.01)

(58) Field of Classification Search
None
See application file for complete search history.

(56) References Cited

U.S. PATENT DOCUMENTS 3,778,244 A   12/1973  Nedelec et al.
4,746,348 A    5/1988  Frank
                      (Continued)

FOREIGN PATENT DOCUMENTS

CN    87105967 A    9/1988
CN     1771203 A    5/2006
                    (Continued)

OTHER PUBLICATIONS

International Search Report as issued in International Patent Application Np. PCT/FR2017/053235, dated Feb. 27, 2018.
(Continued)

*Primary Examiner* — Lisa L Herring
(74) *Attorney, Agent, or Firm* — Pillsbury Winthrop Shaw Pittman LLP

(57) ABSTRACT

A device for manufacturing curved glass, includes a bending station that has a solid concave bending upper mold and a complementary lower countermold, the upper mold being placed above the lower countermold, a conveyor to convey the glass to a final holder placed under the bending upper mold, the final holder being circumscribed, seen from above, by the lower countermold, the final holder forming a surface for receiving the glass, the glass being in an optimal bending position when on this surface, the lower countermold being of the frame type and being able to move vertically in order to pass below or above the surface for receiving the glass, the bending upper mold and the lower countermold being able to move with a relative vertical movement that allows them to be brought together, in order to clamp therebetween the periphery of the glass, and to move apart from each other.

19 Claims, 5 Drawing Sheets

(56) References Cited

U.S. PATENT DOCUMENTS

Figure 1:
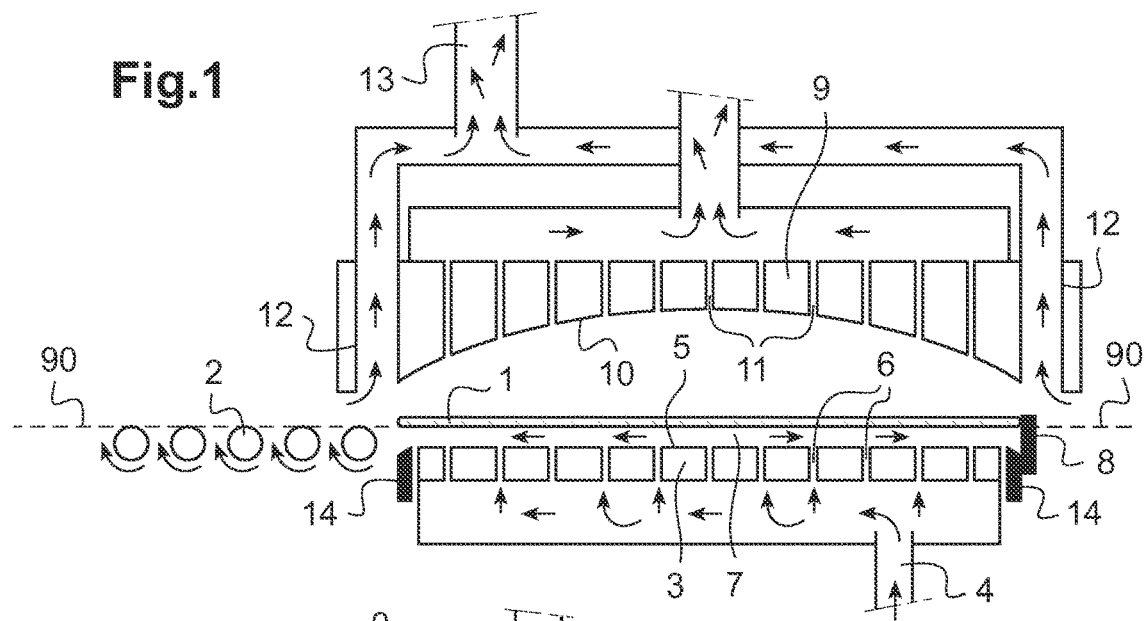

| | | | |
|---|---|---|---|
| 4,828,598 A | 5/1989 | Imamura et al. | |
| 5,769,919 A | 6/1998 | Claassen et al. | |
| 2006/0277947 A1 | 12/2006 | Funk et al. | |
| 2008/0190143 A1* | 8/2008 | Balduin | C03B 35/145 65/106 |
| 2010/0295330 A1* | 11/2010 | Ferreira | B32B 17/10174 296/84.1 |
| 2018/0297886 A1* | 10/2018 | Thomas | C03B 29/08 |

FOREIGN PATENT DOCUMENTS

| | | |
|---|---|---|
| EP | 1 826 186 A2 | 8/2007 |
| EP | 2 571 823 A1 | 3/2013 |
| JP | S46-006041 A | 12/1971 |
| JP | S63-190730 A | 8/1988 |
| WO | WO 2006/072721 A1 | 7/2006 |
| WO | WO 2011/144865 A1 | 11/2011 |
| WO | WO 2016/156735 A1 | 10/2016 |

OTHER PUBLICATIONS

Notice of Reasons for Refusal as issued in Japanese Patent Application No. 2019-528871, dated Aug. 3, 2021.

* cited by examiner

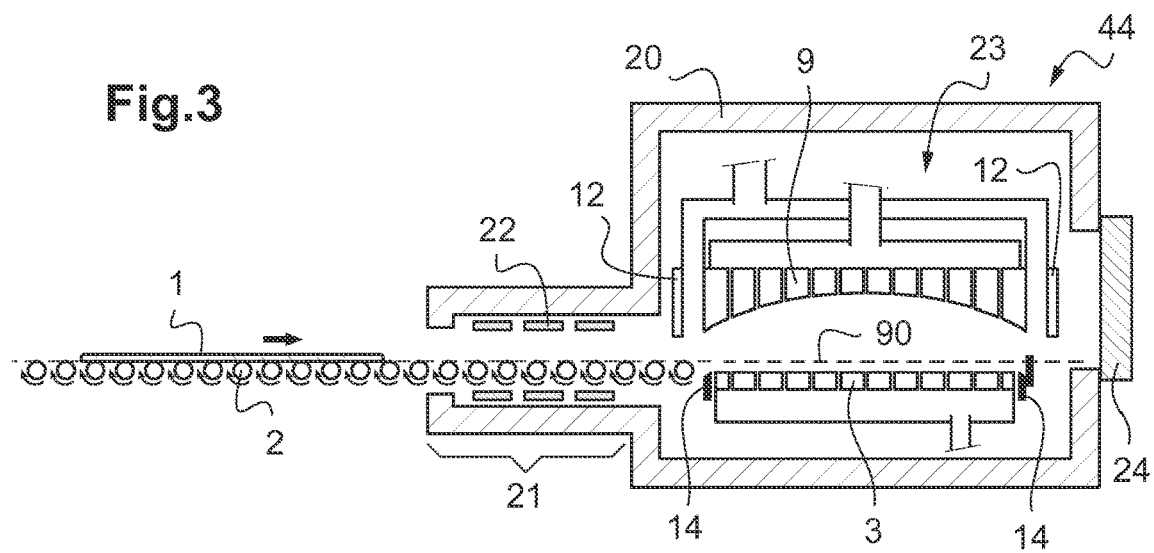
Fig.3
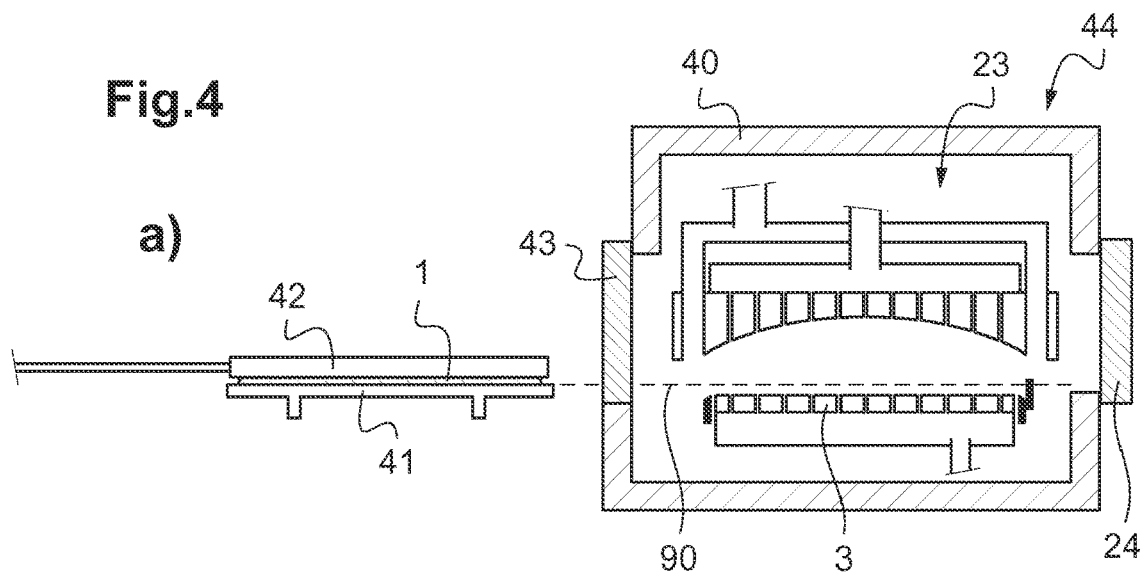
Fig.4 a)
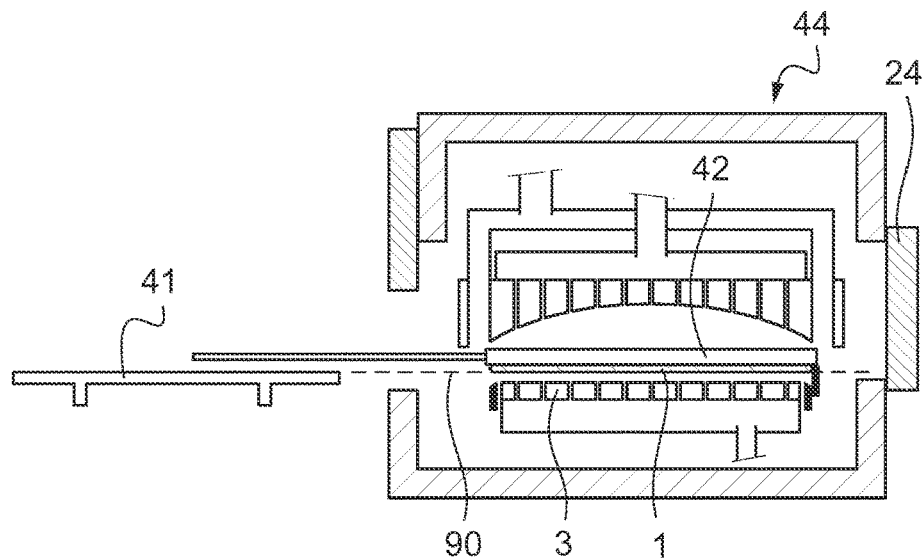
b)

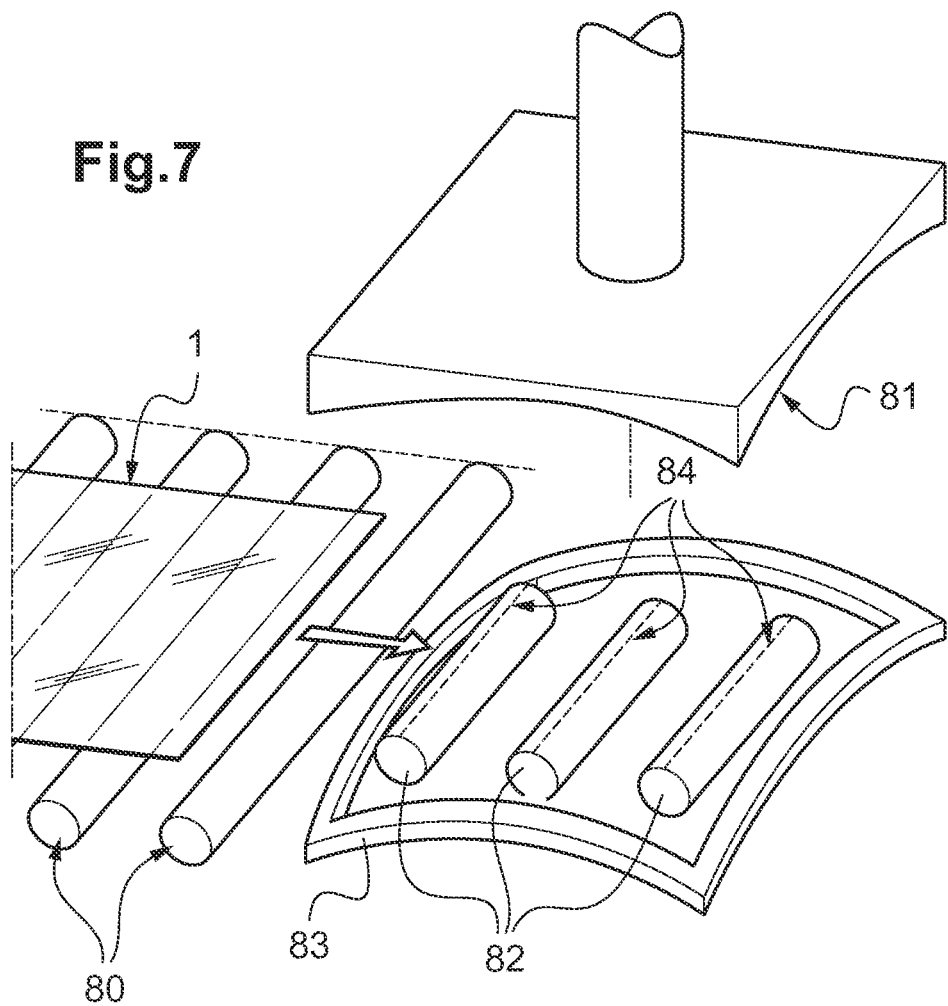

BENDING THIN GLASS

CROSS REFERENCE TO RELATED APPLICATIONS

This application is the U.S. National Stage of PCT/FR2017/053235, filed Nov. 23, 2017, which in turn claims priority to French Patent Application No. 1661720 filed Nov. 30, 2016, the entire contents of all applications are incorporated herein by reference in their entireties.

The invention relates to a device and process for bending glass sheets, in particular sheets of small thickness, in particular sheets of thickness smaller than or equal to 1.3 mm and even of thickness smaller than or equal to 1 mm.

Laminated glazings, one of the glass sheets of which is thinner than the others, and in particular of thickness smaller than or equal to 1.3 mm, have been the subject of a lot of work over the last few years. A thin sheet in particular has the advantage of being light and cold-formable, integration thereof into a laminated glazing leading to a high-quality glazing. Specifically, when a thin glass sheet is incorporated into a laminated glazing, peripheral bubbling or delamination at the glass/PVB interface is minimized. The smaller the thickness of the glass used, the lower the severity of these adverse effects.

Bending device set up specifically depends on sheet thickness and it is difficult to bend, in a given manufacturing run, sheets of different thickness. For this reason, if a laminated glazing comprises sheets of different thicknesses, each sheet is preferably bent individually (as opposed to bending a stack of sheets) in a manufacturing run that is specific to its sheet thickness.

Various processes for bending glass are known, such as gravity bending on a skeleton mold, or press bending. It has been observed that gravity bending of thin glass on a skeleton mold produces corrugations on the periphery of the sheet. Press bending may also give rise to the formation of peripheral creases. The mechanism responsible for the creation of peripheral creases in a sheet is an instability similar to the buckling (or warping) of sheets of elastic material seen in the field of strength testing.

One way to decrease the tendency to form creases during press bending is to first clamp the periphery of the glass between two mold halves, and then to press the rest of the sheet. This type of press bending, in particular achieved via suction against the solid lower bending mold half, has already been proposed in WO2006072721. This process is meant to be used to bend sheets stacked in pairs and involves gravity prebending. In this process, the glass is conveyed under a bending cell by a train of gravity holders, each of which carries one glass stack. The glass is transferred from a holder to the lower bending mold half by way of an upper vacuum pick-up, which picks up the glass, so as to unload it from the gravity holder, and then drops it onto the lower bending mold half—this being done via a suction mechanism. This process has the drawback of implementing gravity prebending, and of thus requiring a plurality of skeleton molds (i.e. the train of holders), and of requiring a vacuum upper mold half.

A bending device that is particularly suitable for thin glass and that does not require gravity bending to be implemented has now been developed. In addition, the glass is bent against a concave solid mold, because it has been observed that bending thin glass against a convex solid mold produced more unacceptable corrugations on the periphery of the glass.

In the present patent application, the glass generally takes the form of an individual sheet, but may also take the form of a stack of a plurality of sheets—generally, in this case, a stack of two sheets. In order to simplify the description of the invention, the term "glass" will simply be used to designate an individual sheet or a stack of sheets. Whether it is a single sheet or a plurality of superposed sheets, the glass has two external main faces, here called the upper face and lower face, the glass being conveyed, throughout the process, with the upper face turned upward and the lower face turned downward. In the case of a stack, the sheets remain stacked throughout the conveying, bending and cooling process, in order to guarantee that all of the sheets, which are intended to be joined, are identically formed. The integration of these glass sheets into the final laminated glazing is thus carried out under the best possible conditions, leading to a glazing of higher quality.

The invention relates to the device of the independent device claim and to those of the claims that are dependent thereon. The invention also relates to the process of the first process claim and to those of the claims that are dependent thereon.

Thus, the invention firstly relates to a device for manufacturing curved glass, said glass comprising a glass sheet or a stack of glass sheets, called the glass, comprising a bending station, said bending station comprising a solid concave bending upper mold and a lower countermold that is complementary to the upper mold, the bending upper mold being placed above the lower countermold, a means for conveying the glass to a final holder placed under the bending upper mold, the final holder being circumscribed, seen from above, by the lower countermold, the final holder forming a surface for receiving the glass, the glass being in an optimal bending position when on this surface, the lower countermold being of the frame type and being able to move vertically in order to pass below or above the surface for receiving the glass, the bending upper mold and the lower countermold being able to move with a relative vertical movement that allows them to be brought together, in order to clamp therebetween the periphery of the glass, and to move apart from each other, the bending upper mold being equipped with orifices in its face that makes contact with the glass and a means for applying suction in order to curve the glass against this contact face via suction applied through said orifices.

The glass is bent in the context of an industrial process, i.e. the one or more glass sheets (in the form of individual sheets or of a stack of a plurality of sheets) are thermally bent one after the other in a bending station then cooled one after the other after bending.

The invention also relates to the process for bending glass with the device according to the invention, comprising placing the glass in its optimal bending position between the bending upper mold and the lower countermold, the glass then being at a plastic-deformation temperature, then clamping the periphery of the glass between the upper mold and the lower countermold, then bending the glass via suction against the upper mold.

The glass is brought, by the conveying means, to an optimal position on the final holder under the bending upper mold. This optimal position is the position in which the glass must be, on the final carrier, if, when it is raised vertically toward the upper mold, it is to be placed, against the upper mold, in the position desired for the pressing and bending. This upward motion, which causes the glass to leave the final holder in order to engage with the upper mold, is achieved via a means for lifting the glass, which may be the lower countermold. Thus, according to this variant, the bending process comprises conveying the glass, via the conveying means, in particular a roller bed, to the final holder, on which the glass attains its optimal bending position between the bending upper mold and the lower countermold, then, the glass being at its plastic-deformation temperature, lifting the glass via the lower countermold until it makes contact with the upper mold, the periphery of the glass then being clamped between the upper mold and the lower countermold, the glass being bent against the upper mold via suction applied through a face thereof, at least partially after the clamping. Specifically, the bending may partially start before the clamping has ended.

The lifting means may be a skirt encircling the upper mold. If the glass is to be raised with a skirt, the glass advantageously protrudes slightly, by a few mm, from the perimeter of the upper mold.

The final holder may be an air cushion or the last rollers of a roller bed having served as the means for conveying the glass. In variants, this final holder may therefore be considered to form part of the conveying means if the glass ends its movement toward its optimal position thereon. In any case, the final holder does not obstruct the vertical movement of the lower countermold that allows it to pass above or below the level at which the glass is received on the final holder. Specifically, whether it is an air cushion or rollers, the final holder is circumscribed, seen from above, by the lower countermold.

The conveying means may comprise a roller conveyor (i.e. a roller bed) extending as far as to under the bending upper mold, in which case the last rollers located under the bending upper mold also form the final holder. However, in the case where the conveying means is a roller bed, the final holder is advantageously an air cushion, the glass passing directly from the roller bed to the air cushion. Specifically, it is tricky to convey thin glass on rollers. This is because the glass, since it makes direct contact with the rollers, has a tendency to easily corrugate on a roller bed when its speed is low, this being unavoidable when the glass reaches the right position with respect to the bending mold. In particular, the risk of corrugations forming is even higher if the glass stops on the rollers. However, with a view to bending, the glass will ideally be positioned (or "focused", i.e. positioned in its optimal position) at very low speeds, the glass possibly even stopping. For this reason, in the present invention, the last seconds of the conveyance of the glass before bending are advantageously spent on an air cushion that moreover forms the final holder. The glass therefore advantageously passes from the roller bed directly to an air cushion placed under the bending upper mold. The glass is "focused" under the bending upper mold while the glass is on the air cushion. The glass is thus positioned correctly with a view to bending thereof without a concavity being produced in the lower face of the glass by gravity bending. In contrast, the heated air of the air cushion causes initial bending so that a concavity forms in the lower face of the glass. This constitutes a prebending operation that produces curvatures in the same direction as those of the final bending (the lower face of the glass becomes concave), this being advantageous. Advantageously, the cushion of hot air is given a slight downward slope in the direction of movement so that the glass can advance onto and over the cushion slowly under the effect of its own weight and of its momentum. The glass may then be "focused" by stops fastened to the periphery of the bending mold or, preferably, of the lower countermold. These stops do not hinder the engagement between the two mold halves (upper mold and lower countermold) required to press the glass, cavities possibly being formed in the mold half devoid of stops in order to accommodate the stops fastened to the other mold half. Advantageously, the stops are flipped exterior side if the edge face of the glass, in the optimal position, on rising upward, risks rubbing against any of the stops. This is for example the case if the final holder is an air cushion and a skirt encircling the upper mold applies suction to the glass before the lower countermold bearing the stops "focusing" the glass is raised.

The conveying means may also comprise an upper pick-up equipped with vacuum holes in the face thereof that is turned downward, and able to pick up the glass outside of the bending station in order, then, to place it in the bending station on the final holder. The vacuum holes are connected to a system for applying suction. Since the glass is uncurved and flat before bending, the upper pick-up is advantageously flat. In this variant, the final holder is advantageously an air cushion. The glass, which is first placed flat on a holder (such as a flat table, which is optionally heated) in proximity to the bending station, is picked up, by the upper pick-up, via application of suction to the upper face of the glass, then, via a lateral movement, the upper pick-up drops the glass on the final holder, by ceasing to apply the suction. Thus, the glass neither undergoes gravity prebending nor stops on the rollers before it is bent by the bending upper mold. In this variant, at the point where it is picked up by the upper pick-up, the flat glass may be at room temperature or, for example, between room temperature and 400° C., and, in any case, below the plastic-deformation temperature domain, and may be located on a holder, such as a table, outside of the bending station. It is then the cushion of hot air that raises the glass to a plastic-deformation temperature. The rapidity of this heating method and its compatibility with an industrially acceptable processing rate increases as the thickness of the glass decreases and, in particular, this method only works because the glass is an individual sheet of thickness smaller than or equal to 1.3 mm and even of thickness smaller than or equal to 1 mm. The main advantage of this configuration is its compactness, as a roller conveyor oven is not used to convey the glass to the bending station. Specifically, a roller conveyor oven takes up floor space. In contrast, cycle time is longer since it is necessary to heat the glass with the cushion of hot air. Advantageously, the bending station is located in an oven, forming a bending cell, said cell being equipped with doors allowing the glass to enter and exit. In order to retain the advantage of compactness while decreasing the inconvenience of the longer cycle time, it is possible to keep the holder on which the glazing is placed outside of the oven at a temperature above room temperature, such as a temperature between 100 and 400° C. or indeed higher. In this operating mode, the glass is an individual sheet because such an upper pick-up cannot pick up a stack of sheets. Thus, the device according to the invention may comprise a solid upper pick-up equipped with orifices in its face that makes contact with the glass and a means for applying suction through these orifices, said pick-up being able to pick up the glass by triggering the application of its suction, said pick-up being moveable and able to pick up the glass outside of the bending post and to transfer it to the bending post before dropping it on the final holder.

The lower countermold is a frame that makes contact with the glass only on its periphery, generally at most 2 cm and preferably at most 1 cm from the edge of the glass. Advantageously, the lower countermold protrudes from the glass toward the exterior. Its contact with the glass may optionally be limited to contact with the bottom vertex of the edge of the glass. The lower countermold (which could also be considered a pressing ring) has a shape that is complementary to that of the upper mold. Thus, when it presses against the periphery of the lower face of the glass, a seal may form between the glass and the upper mold. This pressing action is therefore enough to create the seal between the glass and the bending upper mold. The pressure applied by this pressing action is however preferably sufficiently low to allow the glass to slide between the bending upper mold and the lower countermold. Specifically, as the bending by suction is being carried out, the edges of the glass move toward the interior since the central zone of the glass moves toward the central zone of the upper mold. If the glass cannot slide between the bending upper mold and the lower countermold, then the bending by suction may cause a slight decrease in the thickness of the glass.

The concave bending upper mold and the lower countermold may be moved with a relative vertical movement. This means that the mold and countermold may meet to clamp the glass, either by movement of only one thereof or by movement of both thereof. After the glass has been clamped, they are also able to move apart in order:

to allow the upper mold to drop the glass, in particular on a cooling frame that will have been placed beforehand between the mold and countermold; and to allow the countermold to descend below the level of the glass-receiving surface of the final holder.

The upper mold is solid and equipped with a plurality of orifices in the face thereof that makes contact with the glass. The expression "a solid face" is understood to mean that the face is not of the frame type, making contact only with a periphery, but that its contact surface may make contact with all of a main surface of the glass—the periphery and the central zone. Such a concave contact face equipped with a plurality of orifices is for example shown in FIG. 2 of WO2006/072721, except that in the present invention this face is drilled and oriented downward. A means for applying suction communicates with these orifices in order to apply suction to the upper main face of the glass, which is placed against the contact face, and to bend the glass, via suction applied through said orifices.

For the bending, the glass must be at a plastic-deformation temperature, generally comprised between 640 and 750° C. depending on the composition of the glass. It may be heated during its conveyance by the conveying means. In particular, if it is a question of a roller bed, the latter advantageously passes through a tunnel oven in order to heat the glass. If an air cushion is used by way of final holder, the air cushion is a cushion of hot air at a plastic-deformation temperature of the glass. Advantageously, the bending upper mold is at a temperature below that of the air of the air cushion, and at a temperature that is likely to be sufficiently cool that the glass sets on contact therewith. The shape of the glass is then set and does not change after it is dropped by the bending upper mold. Thus, the glass is cooled on contact with the bending upper mold so as to set its shape to that of the contact face of the bending upper mold.

The glass being at a plastic-deformation temperature, the periphery of the glass is clamped between the upper mold and the lower countermold, then the glass is bent to its final shape against the upper mold by applying suction. The clamping of the glass at its periphery serves to give the periphery of the glass its final shape and to make the contact between the glass and the upper mold seal-tight so that the suction applied by the latter produces a force that presses the glass against the upper mold. Thus, the application of suction through the orifices of the contact face of the upper mold may start before the peripheral pressing action has created a seal.

In a preferred embodiment, the conveying means is a roller bed and the final holder is an air cushion. Advantageously, the glass, in direct contact with the roller bed, is heated on the roller bed to a temperature below the temperature that the hot air of the air cushion will raise it to, so that the glass is not subjected to excessive deformation during its conveyance over the rollers. On reaching the air cushion, it is the hotter air of the air cushion that then raises the glass to its bending temperature. Of course, it is not ruled out that the glass will already be at its plastic-deformation temperature before it reaches the air cushion. Advantageously, the glass passes directly from the roller bed to the air cushion, the latter then being placed just after the roller bed. It is therefore not necessary for the glass to stop between the roller bed and the air cushion.

When the glass is on the final holder and at its bending temperature, the periphery of its upper face must be brought into contact with the upper mold. The latter may drop to meet the glass, and/or a means for lifting the glass may cause the latter to rise. The lower countermold may optionally serve as a lifting means. However, on account of the fact that the glass is at its deformation temperature, a certain amount of gravity bending may take place in the countermold, this being undesirable since this gravity bending will give the glass the inverse shape to the desired shape subsequently given thereto by the upper mold. Specifically, the upper mold is concave so that the upper face of the glass, at the end of the bending operation, is convex; in contrast, gravity bending in the lower countermold will give a concave shape to the upper face of the glass, this being undesirable. Advantageously, the means for lifting the glass is a vacuum skirt that encircles the bending upper mold. A means for applying suction pumps out the air between the skirt and the upper mold. This suction is sufficient to cause the glass (even when it takes the form of a stack of a plurality of sheets) to lift and make contact with the upper mold. Such a skirt is for example illustrated in FIG. 3 of WO2011/144865, except that in this figure the upper mold is convex whereas, according to the invention, the upper mold is concave. Once the glass has made contact with the upper mold, the lower countermold is used to apply pressure to the periphery of the glass and the suction, applied via the orifices in the contact face (and which may be considered to be bending suction), bends the glass. Advantageously, the suction applied via the contact face of the upper mold is applied before the lower countermold is pressed against the glass, in order to start bending the central zone of the glass. The suction applied by the skirt may be turned off once the lower countermold has begun to press the glass against the upper mold. The lower countermold continues to press the glass against the bending upper mold for a little while after application of the bending suction has begun in order 1) to well seal the space comprised between the periphery of the bending face of the upper mold and the periphery of the upper face of the glass; 2) to prevent leaks and thus maintain a good vacuum level (absence of air) between the glass and the bending upper mold; and 3) to leave the glass time to deform and make contact with the surface of the bending upper mold. Afterwards, the lower countermold may be lowered since the glass remains held in contact with the upper mold by virtue of the bending suction.

Thus, according to one advantageous embodiment of the invention, the bending upper mold is equipped with a vacuum skirt that is able to lift the glass and hold it against the upper mold. Once the glass is on the final holder, in particular an air cushion, and at its bending temperature, the vacuum skirt lifts the glass until it makes contact with the bending upper mold, the glass then being clamped between the mold and countermold. The bending may start before the clamping if the suction applied through the contact face of the upper mold is triggered before the clamping. The bending is finished after the clamping. The glass is therefore bent against the bending upper mold via suction applied through a face thereof, at least partially after the clamping and, where appropriate, partially before the clamping.

The invention in particular relates to a process in which the final holder comprises an air cushion, the conveying means comprises a roller bed conveying the glass to the air cushion, the glass being able to pass directly from the roller bed to the air cushion, and the upper mold is equipped with a vacuum skirt able to lift the glass and to hold it against the upper mold, said process comprising conveying the glass, via the roller bed, to the air cushion, on which the glass attains its optimal bending position between the bending upper mold and the lower countermold, then, the glass being at its plastic-deformation temperature, lifting the glass via the vacuum skirt until it makes contact with the upper mold, the periphery of the glass then being clamped between the upper mold and the lower countermold, the glass being bent against the upper mold via suction applied through a face thereof. This bending of the glass is carried out against the bending upper mold via suction applied through a face thereof, at least partially after the clamping, and, where appropriate, partially before the clamping. Specifically, the bending may start before the clamping if the suction applied through the contact face of the upper mold is triggered before the clamping.

The bending upper mold is concave, this having a number of advantages with respect to the case of a convex upper mold. Firstly, this concavity is favorable to the confinement of air and heat in the hollow of the upper mold, hot air then remaining as it were imprisoned in this hollow space. This is very advantageous from the point of view of power consumption. In addition, this concavity allows the upper mold to remain very close to the lower bending elements (final holder and lower countermold), this further reinforcing the confinement of hot air and occasioning shorter movements of the mold and/or countermold. This compactness of the bending station, which is very advantageous from the point of view of power consumption, may even mean that it need not be placed in an oven. Thus, the distance between the final holder (its surface for receiving the glass) and the lowest point of the molding surface of the bending upper mold may even always be less than (10 mm+the thickness of the glass) and even less than (3 mm+the thickness of the glass) or indeed less than (1 mm+the thickness of the glass). Another advantage of the concave shape is that pressing the glass against a convex shape more easily occasions more forceful contact in the central zone during the time that the periphery is in actual contact with the upper mold. In addition, pressing glass against a convex mold occasions the formation of unacceptable creases on the periphery of thin glass, in particular glass of thickness smaller than or equal to 1.3 mm and even of thickness smaller than or equal to 1 mm. It has been observed that this does not occur with a concave mold. Lastly, thin glass is less heavy than thick glass and the application of suction to thin glass via the concave upper mold causes the glass, because of its lightness, to very rapidly rise and press against the mold. Moreover, thin glass more rapidly changes temperature via conduction than thick glass, and hence thin glass rapidly sets once it makes contact with the upper mold.

Once the glass has been bent against the bending upper mold, the two mold halves (i.e. the upper mold and the lower countermold) separate, the glass remaining held against the upper mold, the bending suction of which is maintained. At this stage, in the case of a stack of a plurality of sheets, it may be necessary for the suction of the skirt to also function to keep the whole stack of sheets held against the upper mold. Specifically, the vacuum created via the orifices in the solid face of the bending upper mold is applied, above all, to the top sheet and not to the other sheets of the stack. However, as all these sheets are tightly packed and there is no air therebetween, the stack should remain in the mold even if the skirt's suction is turned off, or at the very least for enough time to allow the cooling frame to be positioned under the glass. If the skirt's suction is stopped once the glass has been pressed between the mold and countermold, then it may optionally be turned back on in order to keep the whole stack held against the upper mold. Where appropriate, the skirt's suction may not be stopped between the point at which the glass is raised toward the upper mold and the point at which it is dropped onto the cooling holder.

After the bending, a laterally moveable cooling frame may be placed under the bending upper mold in order to collect the curved glass dropped by the latter. The cooling frame then retracts the glass from the bending station, and the glass is then transferred to a cooling zone.

The bending station, comprising the bending upper mold with, where appropriate, its skirt, the final holder and the lower bending countermold is not necessarily located in a chamber and may be located in a room in open air. Such an open-air configuration has the following advantages: a) lower cost; b) greater visibility by the operator who can more easily diagnose malfunctions; and c) greater accessibility to the installation, allowing actions to be taken more rapidly in case of an incident. However, this configuration has drawbacks related to energy loss and to possible problems with uncontrolled expansion of the mechanical structures of the installation. Advantageously, the bending station comprising the bending upper mold with its optional skirt, the final holder and the lower countermold, is located in an oven, advantageously equipped with doors in order to confine the heat while allowing the glass to enter and exit. The advantages of this configuration are: a) greater process stability; and b) its various components are better positioned mechanically since poorly controlled expansion of the structures of the installation is prevented. The drawbacks of this configuration essentially reside in the decreased accessibility to the installation.

Advantageously, the upper-bending-mold and lower-countermold surfaces with which the glass makes contact are covered with a refractory fibrous material that is well known in the art, this type of material being used to soften contact between a tool and hot glass. It may in particular be a question of a felt or a knit.

The air cushion may be a simple box drilled with a plurality of holes for injecting hot air. The upper portion of the box, which contains these holes, may be made of metal or of a ceramic. The points of impact of the air jets against the levitating glass may possibly cause small deformations in the glass sheet, which may remain there during the following steps of the bending process. In particular, these defects will possibly become apparent when two component glass sheets are assembled into a final laminated product. The severity of these defects is proportional to the pressure of the injected air and inversely proportional to the number of orifices in the box. To minimize this effect, the air-injecting holes are advantageously spaced apart (hole edge to hole edge) by a distance comprised in the range extending from 1 to 10 mm. The injecting holes may have a diameter comprised in the range extending from 0.5 to 5 mm. Moreover, various trials that have been carried out have shown that it is preferable for the temperature of the air injected by the air cushion and the temperature of the glass itself to be very close. Specifically, when the difference between these two temperature is too large, in particular larger than 5 C, optical distortions may appear in transmission in the final glass products. In this case as well, the severity of these distortions increases when two component glass sheets of a final laminated product are assembled.

The air cushion may also blow its hot air through a porous material. Such a device is very effective and allows the glass to be supported in a very uniform manner. The porous material may for example be composed of a stack of heat-sintered calender-rolled metal sheets, such as the "Plymesh®" sheets sold by Haver & Boecker, or indeed of sintered and compressed stainless steel grains, such as in the "Poral®" products sold by Sintertech.

In order to decrease any potential friction between the glass and the upper surface of the box of the air cushion, a fibrous material, made of refractory fibers, in particular a needled metal felt based on thin fibers of stainless steel, may be fastened to the upper surface of the box of the air cushion. The means for fastening the fibrous material may be a high-temperature adhesive or indeed spot welding. In the case where the box of the air cushion is made of metal with a drilled upper surface, the holes may be produced in the upper sheet of the box and in the metal felt simultaneously, after the felt and sheet have been secured together. The box of the air cushion may advantageously be composed of a plurality of individual compartments that are arranged side by side with respect to the direction of movement of the glass, in order to prevent the cushion from becoming unbalanced as the glazing moves onto the cushion.

The pressure exerted by the air layer between the upper surface of the box of the cushion and the lower surface of the glass may lead to an accumulation of hot air that may suffice to bend the glass (think bubble formation) the latter then curving with a regular shape the convexity of which is directed upward. The amplitude of this bending effect depends on the geometry of the cushion used and the pressures and air flow rate. This effect may be avoided by limiting the amount of air injected under the glass sheet. Moreover, this bending of the glass while it is resting on the cushion of hot air may also be limited by placing vents in the box of the air cushion, these vents allowing hot air to escape and thus preventing accumulation thereof under the glass. These vents are ducts that pass through the box of the air cushion and allow air to be channeled to under the air cushion and removed. The ducts of the vents are independent of the duct(s) serving to supply the air cushion with air.

FIG. 1 shows a device according to the invention ready to bend an individual glass sheet. This device is here shown in open air, i.e. not in a chamber such as an oven. The glass sheet 1 has been conveyed, by the roller bed 2 (conveying means) onto the air cushion 3 (final holder). The latter consists of a box supplied with air via a duct 4, the upper surface 5 of the cushion being drilled with orifices 6 so that jets of air repulse the lower main face 7 of the glass. The movement of the sheet has been stopped in the "focused" optimal position by the stop 8. Such as shown, the sheet is located on the air cushion waiting to be bent. The sheet is located under a bending upper mold 9 the contact face 10 of which (i.e. the face intended to make contact with the glass) is concave and turned downward. This face is equipped with orifices 11, through which suction may be applied to the glass in order to bend it and/or retain it against the upper mold. A skirt 12 encircles the upper mold 9. This skirt is connected to a system 13 for applying suction, this system allowing peripheral suction capable of lifting the glass until it makes contact with the upper mold 9, to be applied. A lower countermold 14 is shown in its lowered position under the plane 90 comprising the glass-receiving surface, in order to allow the glass to pass from the roller bead to the air cushion. In this position, the lower countermold 14 encircles the air cushion 3. The lower countermold 14 is capable of rising, in order to clamp the periphery of the glass against the upper mold 9.

Figure 2:
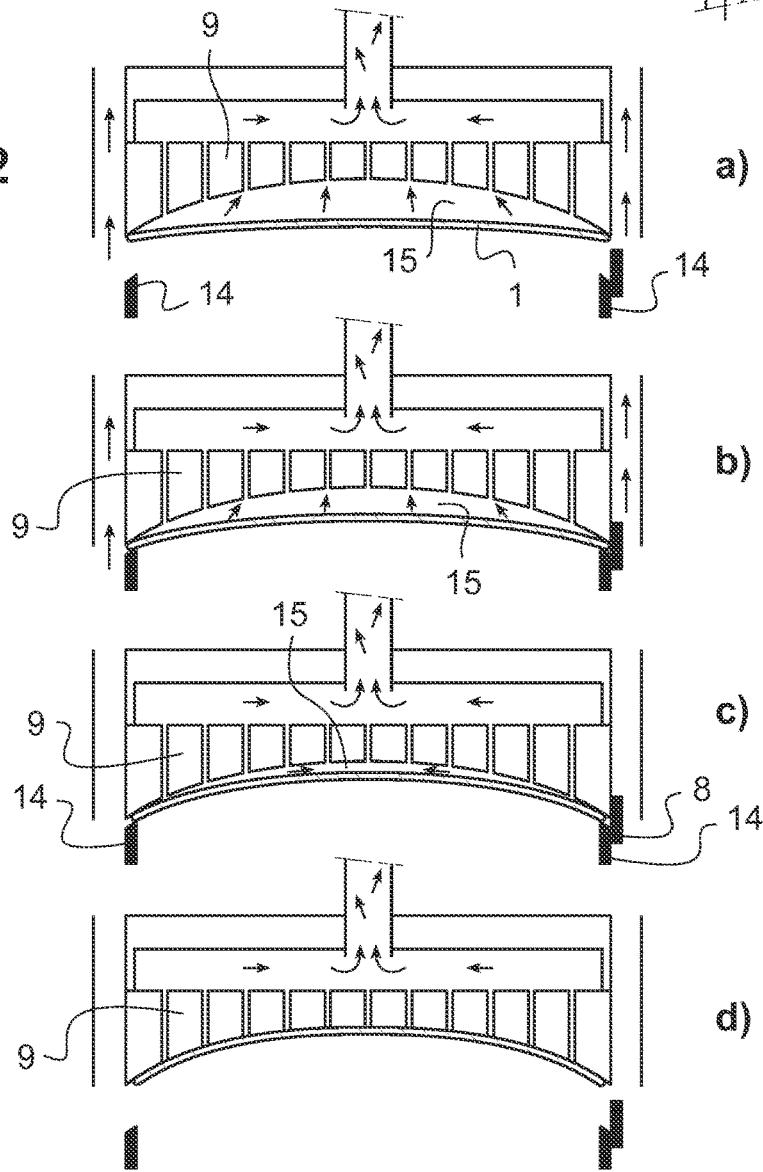

FIG. 2 shows the step of bending the glass against an upper mold 9. At the stage shown in a), the sheet has been raised, by virtue of a skirt, to the point that its periphery has made contact with the upper mold. If the sheet was held by an air cushion, playing the role of the "final holder", it will already have been partially bent on the air cushion. In addition, the suction applied via the concave surface of the upper mold has been triggered before the lower countermold 14 has begun to press against the glass. This suction forms a vacuum in the space 15 between the glass 1 and the upper mold 9, thereby creating a force that acts to bend the glass against the upper mold. The glass has therefore already begun to bend, as shown in a). In b), the countermold 14 is raised in order to lightly press against the periphery of the lower face of the sheet with the aim of making the contact between the glass 1 and the upper mold 9 seal-tight. This pressing gives the periphery of the glass the right shape and the suction applied through the orifices 11 finishes the bending in the central zone as shown in d). The stage shown in b) is an intermediate stage of the bending operation, between a) and c), at which the suction applied by the skirt has still not been stopped. The stage shown in c) is the following stage of the bending operation, the suction applied by the skirt having been stopped. The stage shown in d) is the final stage, the countermold 14 having already been lowered. During this bending process, the edge of the glass is able to slide between the countermold 14 and the upper mold as the central zone of the glass moves toward the central zone of the upper mold.

FIG. 3 shows a device according to the invention that is identical to the one shown in FIG. 1 except that the bending station 23 (air cushion 3 by way of final holder, bending upper mold 9 with its skirt 12, pressing lower countermold 14) is placed in an oven 20, the oven+bending station together forming a bending cell 44. The glass 1 is placed on a roller conveyor 2 (conveying means) leading into the oven. In a first portion 21 of the oven (of tunnel-oven type in this location) electrically powered heating elements 22 start to heat the glass being conveyed to the bending station 23. The glass 1 will reach its bending temperature via heat exchange with the cushion 3 of hot air. The oven comprises a door 24 that is able to open in order to let a cooling frame (not shown) pass, and to close after the glass has been removed.

FIG. 4 shows a device according to the invention that comprises a bending station 23 that is identical to the one shown in FIGS. 1 and 3, said station being in an oven 40. The glass is placed, outside of the bending station, on a platen 41 that is either at room temperature or heated, for example, to between 100 and 400° C. It is then picked up by a flat vacuum upper pick-up 42, which then makes a lateral movement to between the upper mold and the lower countermold before dropping the glass onto the air cushion 3 forming the final holder. The glass is directly heated by the air exiting the air cushion 3. In this embodiment, the upper pick-up 42 picks up the glass (FIG. 4a) by virtue of a suction force and separates it from the platen 41. The door 43 is raised and the upper pick-up 42, acting as conveying means, transfers the glass 1 into the bending cell 44 (FIG. 4b) and drops the glass onto the air cushion 3 (final holder). The upper pick-up 42 may then exit from the bending cell 44 and pick up the glass that is next, which glass will have been deposited on the platen 41 in the meantime. After bending, the glass is removed from the bending cell 44 by a cooling frame that passes through the door 24, collects the glass from under the upper mold, takes it out of the bending cell, and transfers it to a cooling zone.

Figure 5:
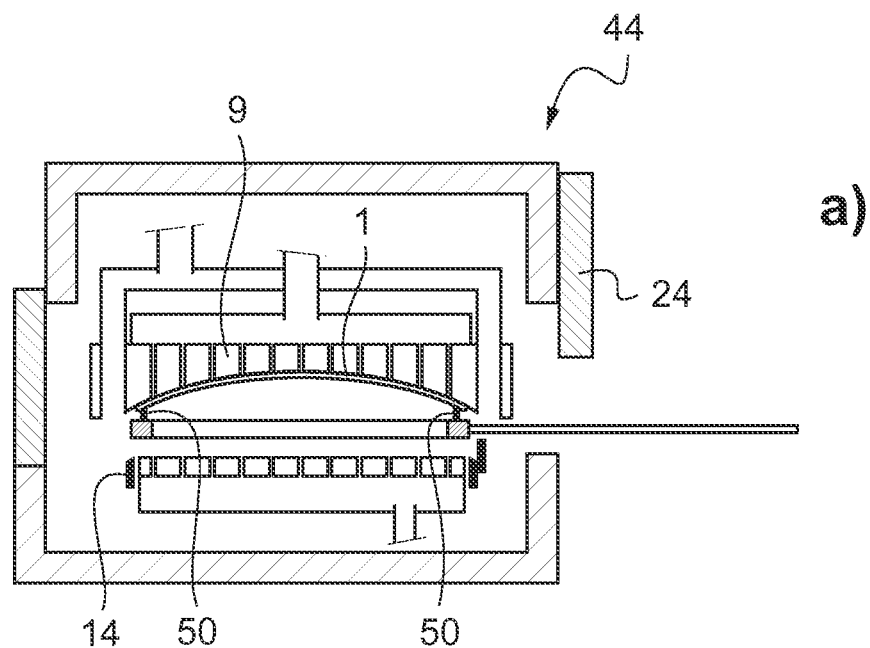
Figure 5:
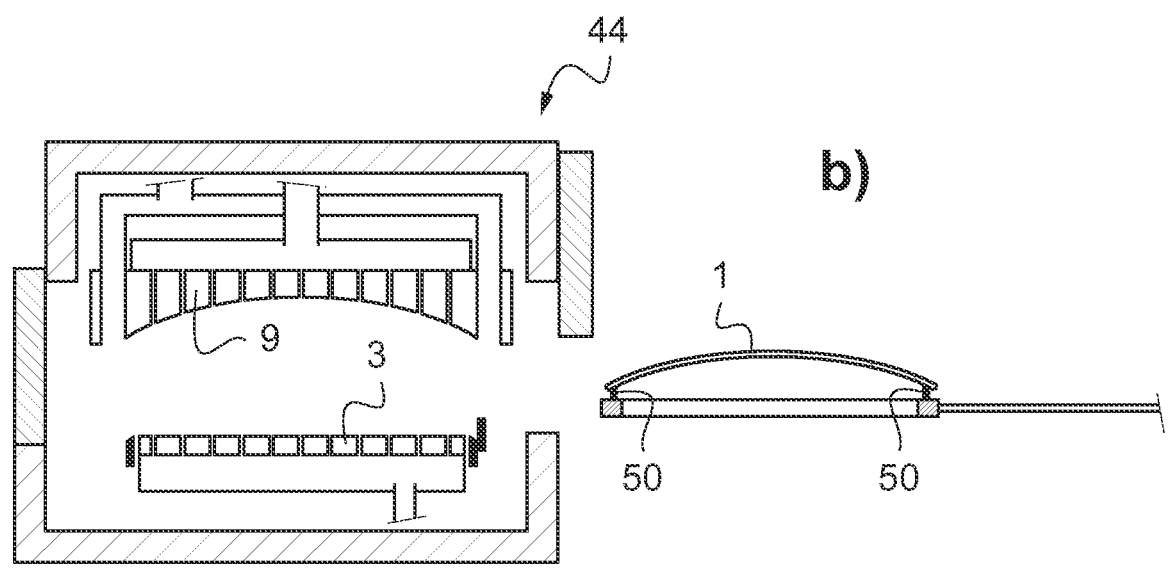

FIG. 5 shows the part of the process according to the invention after the bending. In FIG. 5a), the glass 1 has already been bent by suction against the upper mold 9. The countermold 14 has been lowered and the glass is held against the upper mold 9 because the suction applied via this mold has been maintained. A door 24 has been opened in order to let a cooling frame 50 pass, this frame being placed under the glass. At this stage, the frame provides the glass with an additional contact surface to its own. The suction applied via the upper mold 9 is stopped and where appropriate a slight positive pressure may be applied through the orifices used to apply the suction, in order to make the curved sheet drop onto the cooling frame 50. Once the glass 1 is on the cooling frame 50, the upper mold 9 is raised and the cooling frame 50 is taken out of the bending station 44 (see FIG. 5b) and the glass transferred to a cooling zone.

Figure 6:
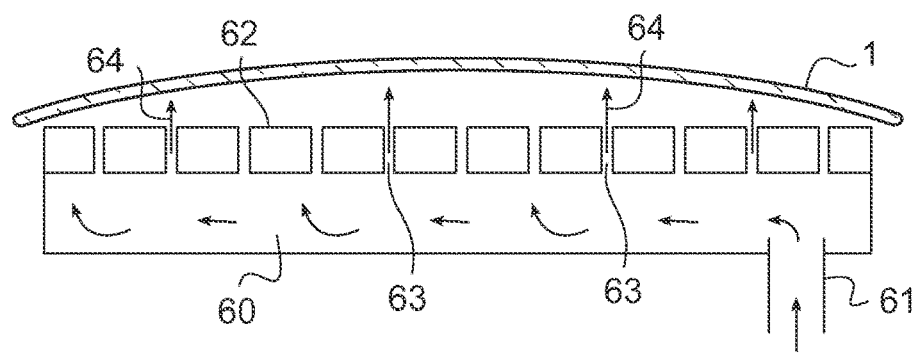
Figure 6:
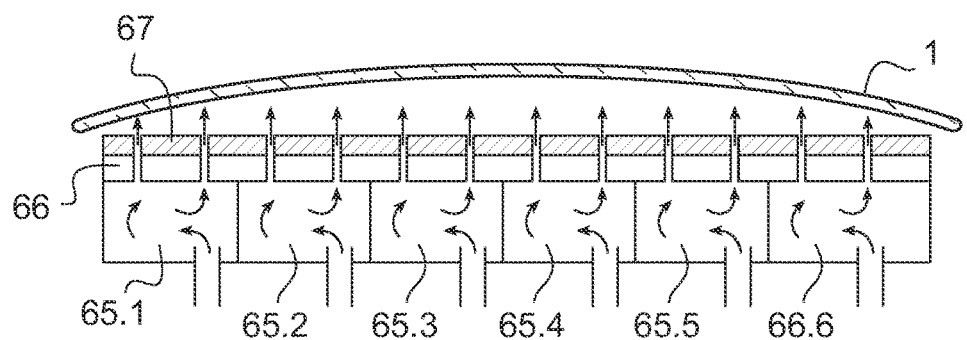
Figure 6:
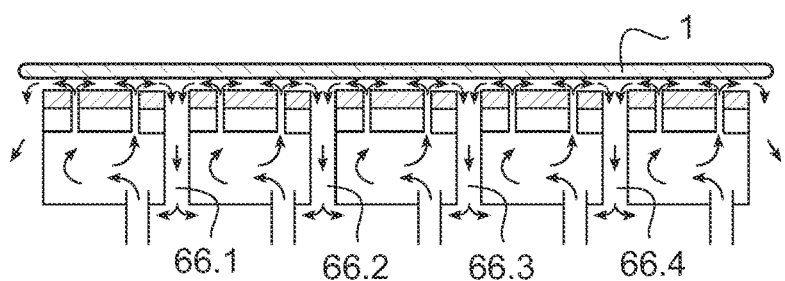
Figure 6:
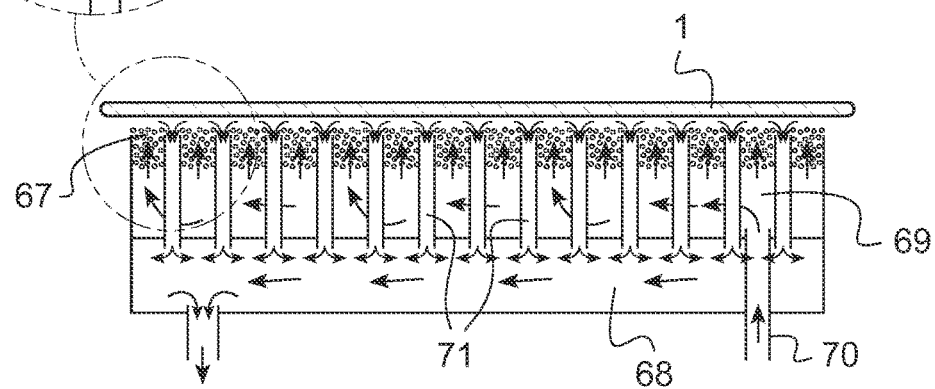

FIG. 6 shows various air-cushion variants. FIG. 6a) shows the simplest embodiment. A box 60 is supplied with air via a duct 61. The upper face 62 of the box is drilled with orifices 63 so that air jets 64 form in the direction of the lower face of the glass. It has been observed that the glass 1 bends naturally on the air cushion so that its lower face becomes concave. This prebending is advantageous and occurs in the same direction as the final bending that the upper mold 9 must perform.

In FIG. 6b), the cushion of hot air is composed of a plurality of individual compartments 65.1 to 65.6, this making it possible to prevent the cushion from becoming aerodynamically unbalanced when the front edge of the glass moves onto the cushion. This is advantageous as, when a piece of glass arrives on the cushion, the aerodynamic equilibrium of one compartment has no influence on that of the following. Here, the upper face of the box is an assembly of a metal plate 66 and a felt 67 securely fastened to the metal plate. The plate and the felt are drilled to form the orifices giving rise to the jets of hot air.

In FIG. 6c), the box comprises a plurality of individual compartments as seen in FIG. 6b), these compartments being separated by a space 66.1 to 66.4 allowing air imprisoned between the cushion and the lower surface of the glazing to be channeled to under the cushion therethrough and thus removed, thereby avoiding an effect whereby the glazing is deformed by the air jets. The glass shown here has not yet bent but bends as shown in a) and b).

In FIG. 6d), the cushion of hot air is unitarily formed (no compartments) and its upper surface 67 is made of a porous material through which the hot air may diffuse. A box 69 is supplied with air via a duct 70 and this air passes through the porous material in order to be blown from the surface thereof toward the glass 1. Vents 71 have been formed through the porous material, allowing air to be channeled to under the cushion therethrough and thus escape. The air of the cushion blown toward the glass and then channeled back into the box is collected in a lower section 68. The glass shown here has not yet bent but bends as shown in a) and b).

FIG. 7 shows an embodiment in which the means for conveying the glass 1 comprises a roller bed 80 that extends as far as to under the bending upper mold 81. The roller bed therefore forms not only the conveying means but also the final holder. The last rollers 82, which form the final holder, offer the glass its optimal position for bending between the bending upper mold 81 and the lower countermold 83. The "focusing" stops, which are attached to the countermold 83, have not been shown. The last rollers are here shorter than the preceding rollers and are circumscribed, seen from above, by the lower countermold 83. The latter may thus be lowered under the glass-receiving surface containing the rollers' lines of contact 84 with the glass (dashed lines in FIG. 7), or may be raised to pick up the glass when the latter is in optimal position and/or to press the periphery thereof against the concave bending upper mold 81.

The invention claimed is:

1. A device for manufacturing curved glass, said glass comprising a glass sheet or a stack of glass sheets, the device comprising a bending station, said bending station comprising a solid concave bending upper mold and a lower countermold that is to be pressed against a periphery of the solid concave bending upper mold, the solid concave bending upper mold being placed above the lower countermold, a conveyor configured to convey the glass sheet in a plane to a final holder placed under the solid concave bending upper mold, the final holder being circumscribed, seen from above, by the lower countermold and having an upper surface below said plane, the final holder forming a surface for receiving the glass sheet, the glass sheet being in a bending position when on said surface, the lower countermold being a frame and being able to move vertically in order to pass below or above the surface for receiving the glass sheet, the solid concave bending upper mold and the lower countermold being able to move with a relative vertical movement that allows them to be brought together, in order to clamp therebetween a periphery of the glass sheet, and to move apart from each other, the solid concave bending upper mold being equipped with orifices in its contact face that makes contact with the glass sheet and a suction system configured to apply suction in order to curve the glass sheet against said contact face via suction applied through said orifices, wherein the device is configured to position the solid concave bending upper mold and the lower countermold relative to each other during at least part of the clamping of the periphery of the glass sheet such that the glass sheet is in contact with a peripheral region of the solid concave bending upper mold and a space is formed between a central portion of the glass sheet and the contact face of the solid concave bending upper mold, said suction forming a vacuum in said space that bends the glass sheet towards the contact face of the solid concave bending upper mold.

2. The device as claimed in claim 1, wherein the conveyor comprises a solid upper pick-up equipped with orifices in its contact face that makes contact with the glass sheet and a suction system configured to apply suction through the orifices, said solid upper pick-up being moveable and able to pick up the glass sheet via suction outside of the bending station and to drop the glass sheet onto an air cushion in the bending station.

3. The device as claimed in claim 1, wherein the solid concave bending upper mold is equipped with a vacuum skirt that is able to lift the glass sheet and hold the glass sheet against the solid concave bending upper mold.

4. The device as claimed in claim 1, wherein a laterally moveable cooling frame is able to be placed under the solid concave bending upper mold in order to collect the curved glass sheet dropped by the solid concave bending upper mold and to retract the curved glass sheet from the bending station.

5. The device as claimed in claim 1, wherein the bending station is in an oven.

6. The device as claimed in claim 1, wherein the conveyor comprises a roller bed that conveys the glass sheet to an air cushion, the glass sheet being able to pass directly from the roller bed to the air cushion.

7. A process for bending glass with the device of claim 6, the solid concave bending upper mold being equipped with a vacuum skirt that is able to lift the glass sheet and hold it against the solid concave bending upper mold, said process comprising conveying the glass sheet, via the roller bed, to the air cushion, on which the glass sheet attains its bending position between the solid concave bending upper mold and the lower countermold, then, the glass sheet being at its plastic-deformation temperature, lifting the glass sheet via the vacuum skirt until the glass sheet makes contact with the solid concave bending upper mold, the periphery of the glass sheet then being clamped between the solid concave bending upper mold and the lower countermold, the glass sheet being bent against the solid concave bending upper mold via suction applied through a face thereof, at least partially after the clamping.

8. A process for bending glass with the device of claim 1, comprising conveying the glass sheet, via the conveyor, to the final holder, on which the glass sheet attains its bending position between the solid concave bending upper mold and the lower countermold, then, the glass sheet being at its plastic-deformation temperature, lifting the glass sheet via the lower countermold until the glass sheet makes contact with the solid concave bending upper mold, the periphery of the glass sheet then being clamped between the solid concave bending upper mold and the lower countermold, the glass sheet being bent against the solid concave bending upper mold via suction applied through a face thereof, at least partially after the clamping.

9. A process for bending a glass comprising a glass sheet or a stack of glass sheets, with the device of claim 1, the process comprising placing the glass sheet in a bending position between the solid concave bending upper mold and the lower countermold, the glass sheet then being at a plastic-deformation temperature, then clamping the periphery of the glass sheet between the solid concave bending upper mold and the lower countermold, the glass sheet being bent against the solid concave bending upper mold via suction applied through a face thereof to form a curved glass sheet, at least partially after the clamping.

10. The process as claimed in claim 9, wherein the solid concave bending upper mold is equipped with a vacuum skirt that is able to lift the glass sheet and hold the glass sheet against the solid concave bending upper mold, and wherein after the glass sheet has reached its bending position on the final holder, the vacuum skirt lifts the glass sheet until the glass sheet makes contact with the solid concave bending upper mold, the clamping then being carried out.

11. The process as claimed in claim 9, wherein after bending, the process further comprises placing a laterally moveable cooling frame under the solid concave bending upper mold, releasing by the solid concave bending upper mold the curved glass sheet so that the laterally moveable cooling frame to collects the curved glass sheet released by the solid concave bending upper mold then retracting the curved glass sheet from the bending station with a view to cooling the curved glass sheet.

12. The process as claimed in claim 9, wherein between a moment at which the glass sheet starts to move closer to the solid concave bending upper mold and its contact with the solid concave bending upper mold, the glass sheet is at a temperature above that of the solid concave bending upper mold.

13. The process as claimed in claim 12, wherein the glass sheet is cooled in contact with the solid concave bending upper mold so as to set its shape to that of the contact face of the solid concave bending upper mold.

14. The process as claimed in claim 9, wherein the glass sheet is an individual sheet of at most 1.3 mm thickness.

15. The process as claimed in claim 14, wherein the glass sheet is an individual sheet of at most 1 mm thickness.

16. The process as claimed in claim 9, wherein the glass sheet is at a temperature comprised between 640 and 750° C. for the bending against the solid concave bending upper mold.

17. A process for bending glass with a device for manufacturing curved glass, said glass comprising a glass sheet or a stack of glass sheets, the device comprising a bending station, said bending station comprising a solid concave bending upper mold and a lower countermold that is to be pressed against a periphery of the solid concave bending upper mold, the solid concave bending upper mold being placed above the lower countermold, a conveyor configured to convey the glass to a final holder placed under the solid concave bending upper mold, the final holder being circumscribed, seen from above, by the lower countermold, the final holder forming a surface for receiving the glass sheet, the glass sheet being in a bending position when on said surface, the lower countermold being a frame and being able to move vertically in order to pass below or above the surface for receiving the glass sheet, the solid concave bending upper mold and the lower countermold being able to move with a relative vertical movement that allows them to be brought together, in order to clamp therebetween a periphery of the glass sheet, and to move apart from each other, the solid concave bending upper mold being equipped with orifices in its contact face that makes contact with the glass sheet and a suction system configured to apply suction in order to curve the glass sheet against said contact face via suction applied through said orifices, the method comprising:

conveying the glass sheet, via the conveyor, to the final holder, on which the glass sheet attains its bending position between the solid concave bending upper mold and the lower countermold, the glass sheet being at its plastic-deformation temperature, lifting the glass sheet via the lower countermold until the glass sheet makes contact with the solid concave bending upper mold, clamping the periphery of the glass sheet between the solid concave bending upper mold and the lower countermold, the glass sheet being bent against the solid concave bending upper mold via suction applied through a face thereof, at least partially after the clamping, wherein a distance between the final holder and the lowest point of a molding surface of the solid concave bending upper mold is always less than 10 mm+a thickness of the glass sheet.

18. The process as claimed in claim 17, wherein the distance between the final holder and the lowest point of the molding surface of the solid concave bending upper mold is always less than 1 mm+the thickness of the glass sheet.

19. A device for manufacturing curved glass, said glass comprising a glass sheet or a stack of glass sheets, the device comprising a bending station, said bending station comprising a solid concave bending upper mold and a lower countermold that is to be pressed against a periphery of the solid concave bending upper mold, the solid concave bending upper mold being placed above the lower countermold, a conveyor configured to convey the glass sheet in a plane to a final holder placed under the solid concave bending upper mold, the final holder being circumscribed, seen from above, by the lower countermold, the final holder forming a surface for receiving the glass sheet, the glass sheet being in bending position when on said surface, the lower countermold being a frame and being able to move vertically in order to pass below or above the surface for receiving the glass sheet, the solid concave bending upper mold and the lower countermold being able to move with a relative vertical movement that allows them to be brought together, in order to clamp therebetween a periphery of the glass sheet, and to move apart from each other, the solid concave bending upper mold being equipped with orifices in its contact face that makes contact with the glass sheet and a suction system configured to apply suction in order to curve the glass sheet against said contact face via suction applied through said orifices, wherein a distance between the final holder and the lowest point of a molding surface of the solid concave bending upper mold is always less than 10 mm+a thickness of the glass sheet.

* * * * *